United States Patent [19]

McKee

[11] Patent Number: 5,778,330
[45] Date of Patent: Jul. 7, 1998

[54] MICROPROCESSOR CONTROLLED NEUTRAL CIRCUIT FOR A POWER TRANSMISSION

[75] Inventor: Kevin D. McKee, Naperville, Ill.

[73] Assignee: Case Corporation, Racine, Wis.

[21] Appl. No.: 547,700

[22] Filed: Oct. 19, 1995

[51] Int. Cl.$^6$ .................. G06G 7/70; F16H 59/74
[52] U.S. Cl. .................. 701/62; 701/51; 701/63; 701/67; 701/68; 74/335; 74/336 R; 477/99; 477/906; 192/3.57; 192/3.63; 180/53.1; 180/273
[58] Field of Search .................. 364/424.081, 424.082, 364/424.091, 424.095, 424.085, 426.01, 424.08, 424.07; 192/3.57, 3.28, 3.63, 3.62, 3.58; 477/99, 123, 71, 78, 85, 74, 906; 74/527, 74, 625, 336 R; 180/271, 273, 53.1; 91/522, 527, 529, 530

[56] References Cited

U.S. PATENT DOCUMENTS

| | | | |
|---|---|---|---|
| 3,574,288 | 4/1971 | Barth et al. | 477/99 |
| 3,937,108 | 2/1976 | Will | 477/126 |
| 4,051,915 | 10/1977 | Behrens | 180/271 |
| 4,267,804 | 5/1981 | Rypka | 74/527 |
| 4,317,500 | 3/1982 | Bening | 180/273 |
| 4,345,489 | 8/1982 | Müller et al. | 475/64 |
| 4,351,206 | 9/1982 | Lemieux et al. | 477/134 |
| 4,561,055 | 12/1985 | McKee | 364/424.081 |
| 4,628,772 | 12/1986 | Nishikawa et al. | 477/125 |
| 4,638,720 | 1/1987 | McKee et al. | 91/522 |
| 4,650,048 | 3/1987 | Gregerson et al. | 192/3.57 |
| 4,651,018 | 3/1987 | Peterson, Jr. | 307/10.6 |
| 4,734,861 | 3/1988 | Bertolasi et al. | 364/424.096 |
| 4,843,901 | 7/1989 | Peterson et al. | 74/335 |
| 4,887,491 | 12/1989 | Holbrook et al. | 477/34 |
| 4,945,484 | 7/1990 | Cote et al. | 364/424.092 |
| 4,967,385 | 10/1990 | Brekkestran et al. | 364/424.089 |
| 5,031,735 | 7/1991 | Holmes | 192/3.57 |
| 5,094,126 | 3/1992 | Stainton et al. | 74/335 |
| 5,109,721 | 5/1992 | Boardman et al. | 74/336 R |
| 5,111,921 | 5/1992 | Marks et al. | 192/4 A |
| 5,251,733 | 10/1993 | Falck et al. | 477/79 |

FOREIGN PATENT DOCUMENTS

| | | |
|---|---|---|
| 57-81628 | 5/1982 | Japan . |
| 1671485-A1 | 8/1991 | U.S.S.R. . |

*Primary Examiner*—Jacques H. Louis-Jacques
*Attorney, Agent, or Firm*—Foley & Lardner

[57] ABSTRACT

A control system is provided for selectively placing a vehicle transmission in a neutral condition after startup of the vehicle. The transmission is of the type including a plurality of intermeshing gears and associated clutches. The clutches are engageable and disengageable in predetermined combinations in response to energization and de-energization of actuator coils to establish predetermined gear ratios between input and output shafts of the transmission. The control system includes a neutral circuit and a control circuit. The neutral circuit causes a current carrying path through the coils to be interrupted under the control of the control circuit. The neutral circuit preferably also causes the transmission to be placed in a neutral condition upon startup of the vehicle engine. The control circuit preferably includes a microprocessor that monitors operating conditions of the vehicle and the control system and causes the neutral circuit to interrupt the current path through the coils upon detection of a system failure. The neutral circuit is configured to latch after startup of the vehicle in neutral and the control circuit causes interruption of power to the coils by removing a ground connection through a relay coil in the neutral circuit.

23 Claims, 7 Drawing Sheets

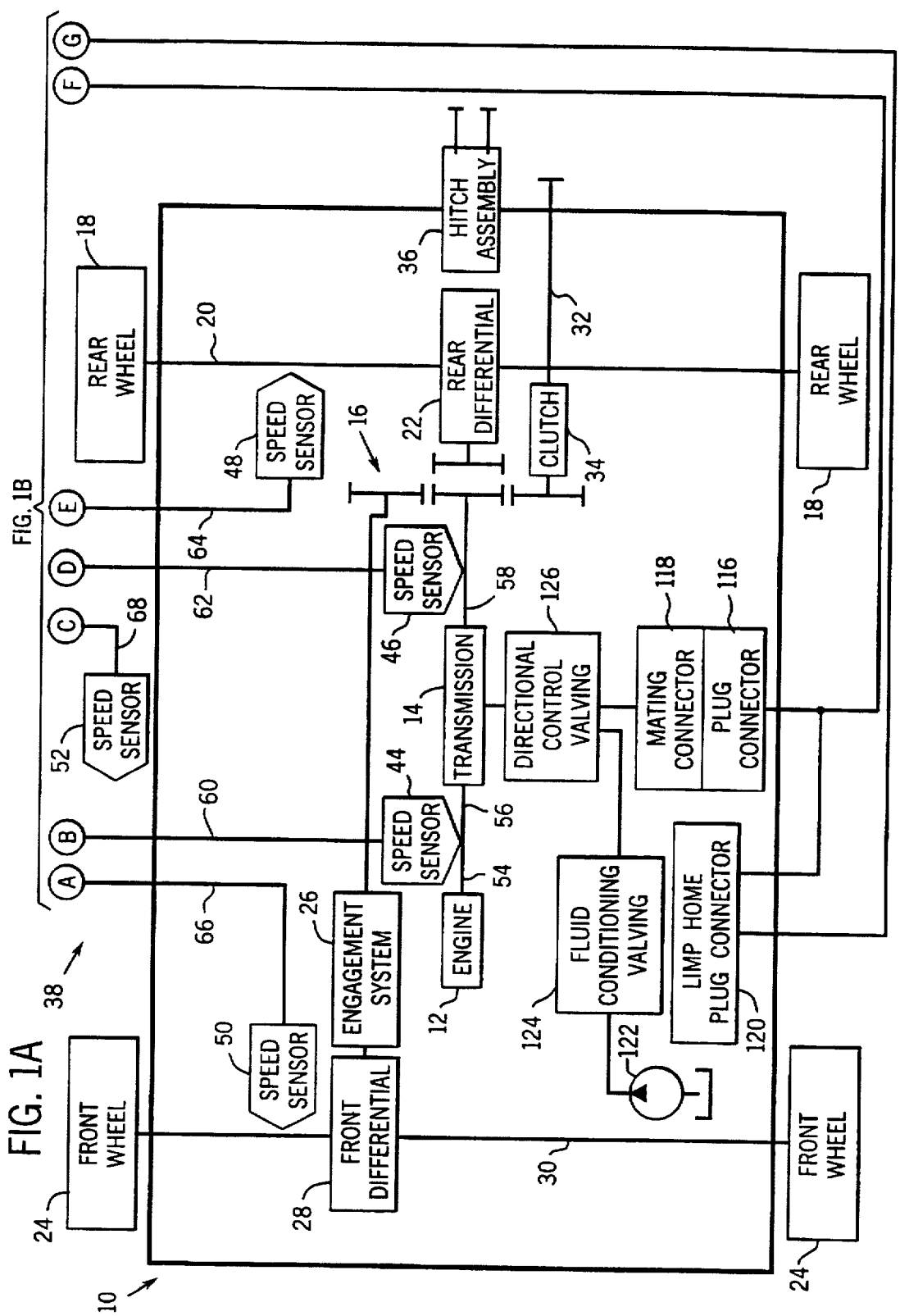

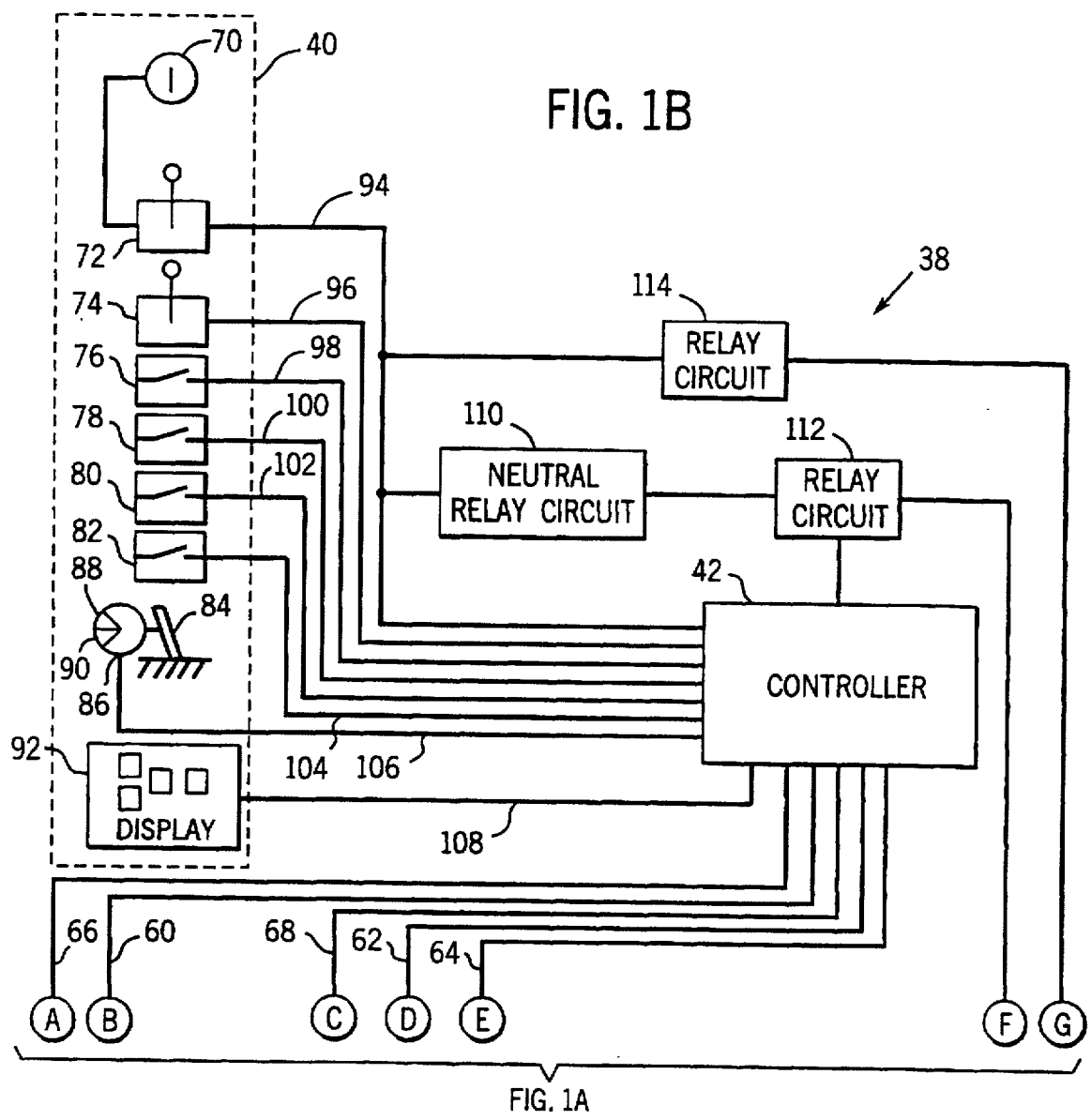

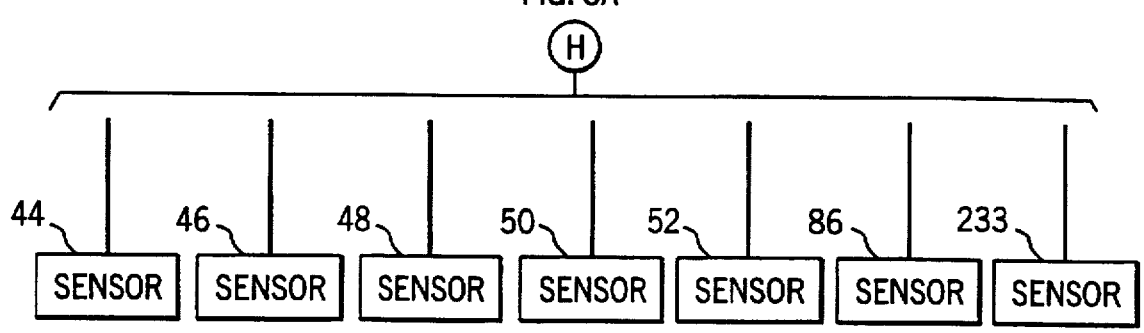

MICROPROCESSOR CONTROLLED NEUTRAL CIRCUIT FOR A POWER TRANSMISSION

BACKGROUND OF THE INVENTION

The present invention relates generally to control of a power transmission in a work vehicle such as an agricultural tractor. More particularly, the invention relates to a microprocessor controlled circuit for disabling a transmission upon the occurrence of certain conditions such as system faults.

In field of transmission systems for work vehicles, such as agricultural tractors, a number of transmission configurations and control schemes have been proposed and are presently in use. Such transmissions typically include a collection of intermeshing gears either fixed to transmission shafts or rotating freely on the shafts. Clutches associated with the freely rotating gears may be selectively engaged to establish a series of speed ratios between an engine output shaft and a transmission output shaft to transmit engine torque at a desired speed to driven wheels of the vehicle. Control systems for commanding engagement of the clutches typically include electronic circuitry that responds to operator controls, such as an upshift/downshift lever, a forward/reverse lever and the like in the vehicle cab. The control system sends electric signals to hydraulic valves that channel pressurized fluid to the clutches. Such control systems thus cause the clutches to engage and disengage in predetermined combinations to accelerate, decelerate and drive the vehicle as desired by the operator. A transmission and a control system of this type are described in U.S. Pat. No. 4,425,620, issued on Jan. 10, 1984 and assigned to Steiger Tractor, Inc.

In such transmission control systems, various approaches have been adopted for automatically placing the transmission in a neutral condition or state in certain stages of operation. For example, it is generally known to provide neutral start circuitry for placing the transmission in neutral during startup of the vehicle. Such systems typically include schemes for disabling a starter coil to prevent the vehicle from being started unless a neutral condition is commanded on an operator command device, such as a shift lever. Such circuitry may also include relays or similar devices that are latched on after startup of the vehicle in neutral. A system generally of this type is described in U.S. Pat. No. 5,251,733.

In another technique, a hydraulic dump or engagement override valve serves to prevent pressure from being transmitted by transmission clutch control valves, thereby preventing engagement of the clutches. Such valves may include arrangements for disabling the vehicle starter unless the valve is in the dump position. Moreover, such valves may be placed in a transmission disabling position upon the occurrence of certain events, such as when the vehicle parking brake is engaged. Systems generally of this type are described in U.S. Pat. Nos. 5,111,921; 4,650,048; 4,267,804; 3,574,288.

While such systems do provide a measure of protection against starting vehicles in gear, they are not without drawbacks. For example, while systems employing dump valves to disable hydraulic transmission clutch circuits can dump pressure during operation of the vehicle to place the transmission in neutral, sticking of the dump valves can lead to residual pressure in the vehicle hydraulic system causing engagement of transmission clutches. Moreover, known systems have generally not permitted a central control circuit to directly disable solenoid coils for transmission control valves by removal of power to the coils, such as in the event of system failures.

SUMMARY OF THE INVENTION

The present invention features a novel control system for vehicle transmissions designed to overcome the drawbacks of existing systems. The system permits a current carrying path to be removed from actuating coils by a control circuit in response to system failures and the like during operation of the vehicle. Moreover, the system preferably accomplishes this interruption utilizing the same neutral circuitry that places the vehicle in neutral upon startup of the vehicle engine. The control circuit is typically a programmed microprocessor that monitors operating conditions of the vehicle and the transmission, and commands the neutral circuitry to interrupt power to the actuating coils upon the occurrence of a fault condition in the control system or in the vehicle.

Thus, in accordance with a first aspect of the invention, a control system is provided for a vehicle transmission of the type including a plurality of intermeshing gears and a plurality of clutches associated with the gears. The gears are coupled through an input shaft to a vehicle engine and through an output shaft to a driven axle. The clutches are engageable and disengageable in predetermined combinations to provide various drive gear ratios between the input shaft and the output shaft in response to control signals. The control system includes a plurality of actuator coils, a coil enabling circuit and a control circuit. The actuator coils are actuatable to selectively engage and disengage the clutches. The coil enabling circuit includes a switch for completing a current carrying path through the actuator coils, and a relay coil for maintaining the switch in an actuator coil enabled position. The control circuit is coupled to the coil enabling circuit and selectively completes and interrupts a current path through the relay coil to control the position of the switch and thereby enable and disable the actuator coils.

In accordance with another aspect of the invention, a control system is provided in a work vehicle, such as an agricultural tractor for selectively placing a transmission in a neutral state. The transmission is of the type including a plurality of intermeshing gears associated with a plurality of clutches, the clutches being engageable and disengageable in predetermined combinations by electrical energization and de-energization of actuator coils to establish predetermined forward and reverse gear ratios between a vehicle engine and a driven axle through the transmission. The control system includes a coil enabling circuit and a control circuit. The coil enabling circuit includes a switch having at least two conductive states for selectively completing and interrupting a common electrical current carrying path to the actuator coils. The control circuit is coupled to the coil enabling circuit and controls the conductive state of the switch to disable the actuator coils without operator intervention during operation of the vehicle.

In accordance with a further aspect of the invention, a transmission control system includes a neutral circuit and a control circuit. The neutral circuit is coupled to the transmission clutch actuator coils and prevents energization of the coils to place the transmission in a neutral condition upon startup of the vehicle. The control circuit is coupled to the neutral circuit and cooperates with the neutral circuit to selectively prevent energization of the coils after startup of the vehicle. The neutral circuit is preferably a neutral latch circuit that is latched upon startup of the vehicle engine with the transmission in a neutral condition. The control circuit preferably prevents energization of the coils by unlatching the neutral circuit, such as upon detection of a fault condition in the vehicle or the control system.

BRIEF DESCRIPTION OF THE DRAWINGS

The present invention will become more fully understood from the following detailed description, taken in conjunction with the accompanying drawings, wherein like reference numerals refer to like parts, in which:

FIGS. 1A-B are a diagrammatical view of a work vehicle incorporating an exemplary transmission control system;

DESCRIPTION OF THE PREFERRED EMBODIMENTS

Figure 2:
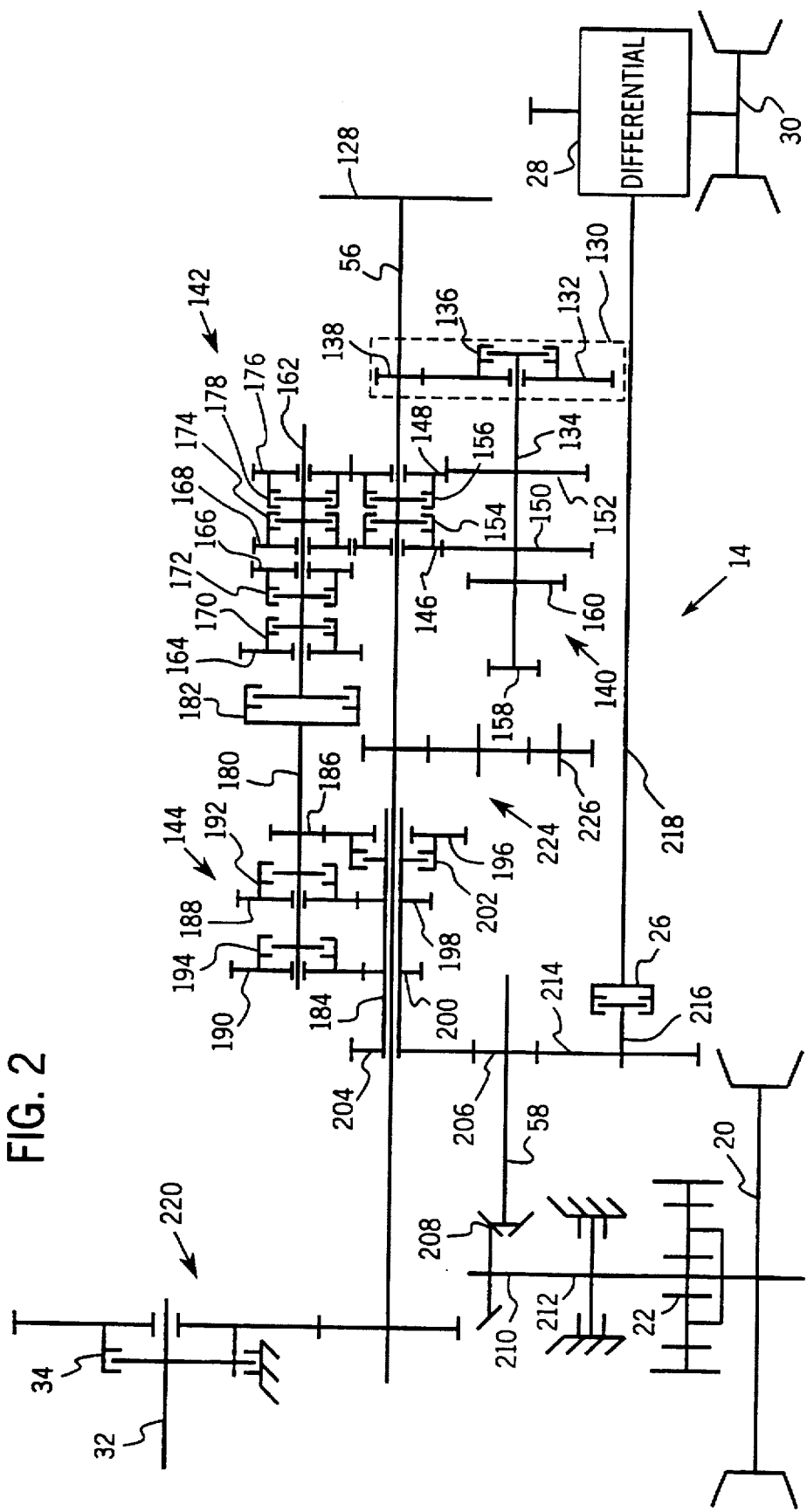
FIG. 2 is a diagrammatical view of a vehicle transmission of the type controlled by the system illustrated in FIGS. 1A-B.

Turning now to the drawings and referring to FIGS. 1A-B, a vehicle, such as an agricultural tractor, designated by the reference numeral 10, includes an engine 12 mechanically coupled to a transmission 14. Transmission 14 selectively drives gearing, designated generally the reference numeral 16, at various gear ratios as commanded by an operator and controlled by a controller as described below. Gearing 16 drives rear wheels 18 mounted on a rear axle 20 through a rear differential 22. Gearing 16 preferably also permits transmission 14 to drive front wheels 24 through a front wheel drive engagement system 26, front differential 28 and front axle 30. Gearing 16, differentials 22 and 28 and front wheel drive engagement system 26 may be of generally known construction. Gearing 16 is also coupled to a power take off shaft 32 through a power take off clutch 34 for driving various implements (not shown) which may be coupled to vehicle 10, such as on a hitch assembly 36.

The operation of transmission 14 is controlled by a control system, indicated generally by the reference numeral 38. Control system 38 includes operator command devices in an operator station 40, typically located in a covered vehicle cab (not shown). Control system 38 also includes a transmission controller 42 coupled to operator station 40 and to instrumentation and control circuitry as described below.

As schematically illustrated in FIGS. 1A-B, instrumentation for control system 38 preferably includes speed sensors 44, 46, 48, 50 and a ground speed sensor 52. Speed sensor 44 is associated with an engine output shaft 54 linking engine 12 to transmission 14, or with a transmission input shaft 56 coupled to shaft 54. Speed sensor 46 is associated with a transmission output shaft 58. Speed sensors 44 and 46 may be of any suitable type, such as a magnetic proximity sensor associated with a toothed timing gear (not shown), as are well known in the art. Sensors 44 and 46 produce electrical signals representative of the rotational speed of shafts 54 (or 56) and 58, respectively, and apply these speed signals to transmission controller 42 through data communication lines 60 and 62, respectively. Speed sensors 48 and 50, which may be substantially identical to speed sensors 44 and 46, are associated with rear axle 20 and front axle 30, respectively. Sensors 48 and 50 produce electrical signals representative of the rotational speed of axles 20 and 30, and apply these signals to transmission controller 42 via communication lines 64 and 66, respectively. Ground speed sensor 52 preferably includes a radar emitter and receiver unit of generally known construction and is secured on vehicle 10, directed generally downwardly. Ground speed sensor 52 produces an electrical signal representative of the vehicle ground speed and applies this signal to transmission controller 42 via a communication line 68.

The signals produced by sensors 44, 46, 48, 50 and 52 are used as control inputs by controller 42 as described below. It should be noted that in appropriate situations, control system 10 may include more or fewer speed sensors, such as where the signals produced by one or more of sensors 44, 46, 48, 50 and 52 are redundant, or where a signal representative of the parameter sensed by a particular sensor is available from an alternative source. For example, ground speed sensor 52 provides an indication of the ground speed of vehicle 10. However, where front axle 30 is not positively driven by engine 12, the output of speed sensor 50 may be used for this purpose, or speed sensor 50 may be eliminated from the system and only ground speed sensor 52 used for the ground speed-related signal.

In the preferred embodiment illustrated, operator station 40 includes a key switch 70, a forward-neutral-reverse-park (FNRP) selection lever 72, a gear ratio increment and decrement, or "bump" lever 74, an automatic/manual selection switch 76, a diagnostic request switch 78 and a creeper switch 80. System 38 may include switches for additional operator commanded inputs, as indicated by the reference numeral 82. The interconnections between these components and transmission controller 42 are described in greater detail below. Generally however, key switch 70 permits an operator to selectively enable and completely disable the operation of vehicle 10 and transmission 14. FNRP lever 72 may be placed in four stable positions, including "forward," "reverse," "neutral" and "park," and permits an operator to selectively command controller 42 to shift transmission 14 into various forward, reverse and neutral gear ratios for driving vehicle 10 in a desired direction of travel and at desired speeds, as well as to lock transmission 14 in a "parked" configuration discussed below. Bump lever 74 allows the operator to increment or decrement the selected gear ratio and to preselect forward and reverse gear ratios to which transmission 14 will be shifted. Selection switch 76 permits the operator to override certain automatic control functions of controller 42 described below. Creeper switch 80 allows the operator to selectively engage an extremely low range of gear ratios where corresponding creeper gearing and a creeper clutch are provided in transmission 14.

Operator station 40 also includes a clutch pedal 84 coupled to a position sensor 86, and top-of-clutch and bottom-of-clutch switches 88 and 90, respectively. Movement of clutch pedal 84, as sensed by position sensor 86 and switches 88 and 90, permits a vehicle operator to regulate certain control functions of controller 42 as described below. Position sensor 86 may be of any suitable type, such as a rotary or linear potentiometer, which generates a signal representative of the position of clutch pedal 84. Top-of-clutch switch 88 and bottom-of-clutch switch 90 are two-position switches that provide signals to controller 42 indicating when clutch pedal 84 is in its fully raised and fully depressed positions, respectively. In addition, operator station 40 includes a visual display 92 for providing an operator with information relating to the state of transmission 14 (e.g. direction and level of selected gears, diagnostic codes, and the like).

Levers 72 and 74, and switches 76, 78, 80 and 82 are linked to transmission controller 42 via communication lines 94, 96, 98, 100, 102 and 104, respectively, and apply operator-induced command signals to controller 42 through their respective communication lines. Sensor 86, and top and bottom of clutch switches 88 and 90 are similarly linked to controller 42 via one or more communication lines 106. Display 92 receives data from controller 42 via a similar communication line 108, typically in the form of a conductor bundle or instrumentation harness.

As illustrated schematically in FIGS. 1A–B, in addition to supplying command signals to controller 42, FNRP lever 72 is coupled to controller 42 through a neutral relay circuit 110 and a neutral latch circuit 112 for selectively placing and maintaining transmission 14 in a neutral condition. Moreover, FNRP lever 72 is also coupled to a limp home relay circuit 114 for selectively permitting vehicle 10 to be placed in preselected limp home gear ratios in the event of a system failure. The preferred structure and function of relay circuits 110, 112 and 114 will be described in greater detail below. Neutral latch relay circuit 112, a park switch (described below) and controller 42 are coupled to a plug connector 116 through which controller 42 provides control signals for regulating the operation of transmission 14. In normal operation, plug connector 116 is joined to a mating connector 118, whereas the latter mating connector 118 may be coupled to a limp home plug connector 120 for providing alternative circuitry paths ensuring limited transmission operation in the event of system failure as described below.

At the direction of control signals from controller 42, communicated through plug connectors 116 and 118, transmission 14 may be engaged in several distinct gear ratios via a hydraulic circuit that includes a fluid pump 122, fluid conditioning valving 124 and directional control valving 126. Pump 122 may be of any suitable type, such as a hydraulic gear pump, and will typically be coupled to engine 12 for pressurizing hydraulic for use in engaging selected clutches of transmission 14. Fluid conditioning valving 124 typically includes a pressure relief valve (not shown) for limiting system pressure, as well as appropriate pressure regulating valves as are well known in the art. Directional control valving 126 includes a bank of spring-biased, two-position, three-way valves of known construction, plumbed to receive pressurized fluid from valving 124 and to selectively direct the fluid to transmission 14. Each directional control valve in valving 126 includes a solenoid which may be energized by a control signal from controller 42 to shift the associated valve from a closed position to an open position to actuate or engage a fluid clutch within transmission 14.

Turning more particularly to the structure and operation of transmission 14, while any one of a variety of transmissions may be controlled by control system 38, FIG. 2 illustrates diagrammatically the presently preferred configuration. Transmission 14 is of a type known generally as a "power-shift transmission," wherein several sets of gears are associated with transmission shafts and certain of the gears may be selectively rotationally fixed with respect to their shafts by engagement of an associated fluid clutch to define desired gear ratios between input shaft 56 and output shaft 58. In the transmission illustrated in FIG. 2, an engine drive plate 128 is driven in rotation by the vehicle engine. Drive plate 128 is coupled to transmission input shaft 56 and powers drive shaft 56 in rotation. Gear sets, along with associated fluid clutches and transmission shafts permit a number of different gear ratio combinations to be defined for driving transmission output shaft 58 at desired speeds as follows.

A creeper gear set 130 includes a creeper gear 132 mounted on and rotational with respect to a second transmission shaft 134. A creeper clutch 136 is engageable to lock creeper gear 132 against rotation on shaft 134. Creeper gear set 130 also includes a gear 138 fixed to shaft 56 and continuously meshing with creeper gear 132. Engagement of creeper clutch 136 results in driving shaft 134 through gears 138 and 132 to obtain an extremely slow output speed of shaft 58. Creeper gear set 130 may be optionally excluded from transmission 14.

Transmission 14 includes three groups of gear sets, identified in FIG. 2 by the reference numerals 140, 142 and 144. First group 140 includes first and second gears 146 and 148 supported on and rotational with respect to shaft 56. Additional gears 150 and 152, fixed on second shaft 134 mesh continuously with gears 146 and 148, respectively. Fluid clutches 154 and 156 are associated with gears 146 and 148, respectively, and may be engaged to lock their associated gear against rotation on shaft 56. In operation, either clutch 154 or clutch 156 is engaged to obtain an input-to-output gear ratio, or both clutches may be released or disengaged to interrupt the transmission of power to shaft 134. In the preferred embodiment shown, gear combination 146 and 150 define a ratio 34:39, while gears 148 and 152 have a ratio of 37:37.

Second gear set group 142 includes gear 150, as well as to additional gears 158 and 160, all fixed on second shaft 134. Supported on a third transmission shaft 162 and rotational with respect to third shaft 162, three gears 164, 166 and 168 mesh continuously with gears 158, 160 and 152, respectively. Fluid clutches 170, 172 and 174 are associated with gears 164, 166 and 168, respectively, and may be engaged to lock the associated gear against rotation on shaft 162. Thus, either one of clutches 170, 172 or 174 may be engaged to transmit power between second shaft 134 and third shaft 162, or all of the clutches may be released to interrupt power transmission between the shafts. In the preferred embodiment illustrated, gear combination 158 and 164 provide a gear ratio of 29:44, combination 160 and 166 provide a ratio of 34:39, and combination 150 and 168 provide a ratio of 39:34.

A reverse gear set is provided adjacent to second gear set group 142 on shaft 162, and includes a reverse gear 176 mounted on and rotational about shaft 162. A reverse clutch 178 is associated with reverse gear 176 and may be engaged to lock reverse gear against rotation with respect to shaft 162, placing transmission 14 in one of several reverse gear ratios.

Third shaft 162 is aligned with and may be selectively coupled to a fourth transmission shaft 180 via a master clutch 182. Thus, when master clutch 182 is fully engaged, shaft 180 rotates at the same speed and in the same direction as shaft 162. As discussed below, master clutch 182 is preferably modulated into and out of engagement, such as by pulse-width-modulating a proportional directional control valve (not shown) included in valving 126. However, master clutch 182 may be mechanically or electro-mechanically modulated by techniques well known in the art.

Third gear set group 144 selective couples shaft 180 with a further shaft 184 disposed about shaft 56. Third gear set group 144 includes a first gear 186 fixed to shaft 180, and a pair of gears 188 and 190 supported on and rotational with respect to shaft 180. Clutches 192 and 194 are associated with gears 188 and 190, respectively, and may be engaged to lock the associated gear against rotation on shaft 180. Gears 186, 188 and 190 mesh continuously with corresponding gears 196, 198 and 200, respectively, on shaft 184. Gear 196 is supported on and rotational with respect to shaft 184, whereas gears 198 and 200 are fixed to shaft 184. A fluid clutch 202 is associated with gear 196 and may be engaged to lock gear 196 against rotation on shaft 184. Thus, by selectively engaging either clutch 192, 194 or 202, shaft 184 is caused to rotate at a predetermined speed ratio as shaft 180 is driven in rotation. In the presently preferred embodiment, gear combination 186 and 196 provide a gear ratio of 22:54, combination 188 and 198 provide a ratio of 37:39, and combination 190 and 200 provide a ratio of 52:24.

Shaft 184 transmits power to transmission output shaft 58 through gears 204 and 206, fixed on shafts 184 and 58 respectively and arranged to continuously mesh with one another. As illustrated in FIG. 2, output shaft 58 transmits power to rear axle 20 through bevel gears 208 arranged to drive a differential input shaft 210. A master brake 212 is provided on shaft 210 for braking vehicle 10. In addition to driving rear axle 20, in the preferred embodiment illustrated in FIG. 2, gear 206 carried by output shaft 58 meshes with a further gear 214 supported on a front wheel drive clutch shaft 216. A front wheel drive shaft 218 may be selectively coupled to clutch shaft 216 by front wheel drive clutch 26, and extends to front wheel drive differential 28 for driving front axle 30.

In addition to the gearing described above, transmission 14 is preferably arranged for driving power take off shaft 32 via power take off gearing 220, including power take off clutch 34. Transmission 14 also includes gearing, designated generally by the reference numeral 224, for driving a pump drive shaft 226.

All of the clutches contained in transmission 14 are preferably fluid clutches of a type well known in the art. Such clutches are typically biased in a disengaged position and engageable by the application of pressurized fluid. Moreover, while clutches 154, 156, 170, 172, 174, 178, 192, 194 and 202 may be modulated into and out of engagement, such as by gradually shifting a proportional hydraulic valve in valving 126, in the presently preferred embodiment, these clutches are engaged by hydraulic valves that are shifted directly between pressure transmitting and pressure relieving positions. However, to permit smooth transitions in shifting, master clutch 182 is preferably modulated into and out of engagement by pulse width modulating a proportional directional control valve in valving 126. Thus, direct shifting between selected gears, commonly known in the art as power shifting, may be performed by disengaging outgoing clutches (corresponding to the gear ratio being shifted from) while engaging incoming clutches (for the gear ratio being shifted to), in a coordinated and timed manner with master clutch 182 engaged. In appropriate situations where transmission 14 is to be shifted over a broad range of gear ratios, certain intermediate gear ratios may be skipped, in accordance with a technique well known in the art as "skip shifting." On the other hand, modulated shifting may be commanded by fully engaging clutches corresponding to a desired gear ratio with master clutch 182 disengaged, then modulating engagement of master clutch 182. Such modulated shifting is extremely useful in certain shifting situations, such as starting from a stop and shuttle shifting between forward and reverse gear ratios.

In the presently preferred embodiment, controller 42 may command all of these types of shifting depending upon the operating conditions of transmission 14. Techniques for power shifting, skip shifting and modulated shuttle shifting are well known in the art. By way of example, such techniques are described in U.S. Pat. No. 4,967,385, issued on Oct. 30, 1990 to Brekkestran et al. and assigned to J. I. Case Company, which is hereby incorporated herein by reference. As will be appreciated by those skilled in the art, transmission 14 may execute power shifts and skip shifts both while upshifting to higher gear ratios in the same direction and while downshifting to lower gear ratios in the same direction. Similarly, transmission 14 may execute modulated shuttle shifts both from forward gear ratios to reverse gear ratios and vice versa.

By engaging combinations of clutches, transmission 14 establishes a number of predetermined gear ratios between input shaft 56 and output shaft 58. In particular, for the transmission illustrated in FIG. 2, the following gear ratios are provided (the prefixes F, R, C and CR representing forward, reverse, forward creeper and reverse creeper gear ratios, respectively):

| Gear ratio | Clutches engaged |
| --- | --- |
| F1 | 154, 170, 202 |
| F2 | 156, 170, 202; |
| F3 | 154, 170, 202; |
| F4 | 156, 172, 202; |
| F5 | 154, 172, 202; |
| F6 | 156, 174, 202; |
| F7 | 154, 170, 192; |
| F8 | 156, 170, 192; |
| F9 | 154, 172, 192; |
| F10 | 156, 172, 192; |
| F11 | 154, 174, 192; |
| F12 | 156, 174, 192; |
| F13 | 154, 170, 194; |
| F14 | 156, 170, 194; |
| F15 | 154, 172, 194; |
| F16 | 156, 172, 194; |
| F17 | 154, 174, 194; |
| F18 | 156, 174, 194; |
| R1 | 154, 178, 202; |
| R2 | 156, 178, 202; |
| R3 | 154, 178, 192; |
| R4 | 156, 178, 192; |
| C1 | 136, 170, 202; |
| C2 | 136, 172, 202; |
| C3 | 136, 174, 202; |
| C4 | 136, 170, 192; |
| C5 | 136, 172, 192; |
| C6 | 136, 174, 192; |
| CR1 | 136, 178, 202; |
| CR2 | 136, 178, 192. |

It should be noted that for forward gear ratios, only one clutch of each gear set group 140, 142 and 144 is engaged. Similarly, for reverse gear ratios, the reverse gear clutch 178 is engaged along with a clutch from the first and third gear set groups 140 and 144. Moreover, for creeper gear ratios, the creeper clutch 136 is engaged along with a clutch from the second gear set group 142 (or the reverse gear clutch 178) and a clutch from the third gear set group 144. As mentioned above, all gear combinations require engagement of master clutch 182 for transmission of power through transmission 14.

Figures 3A, 3B:
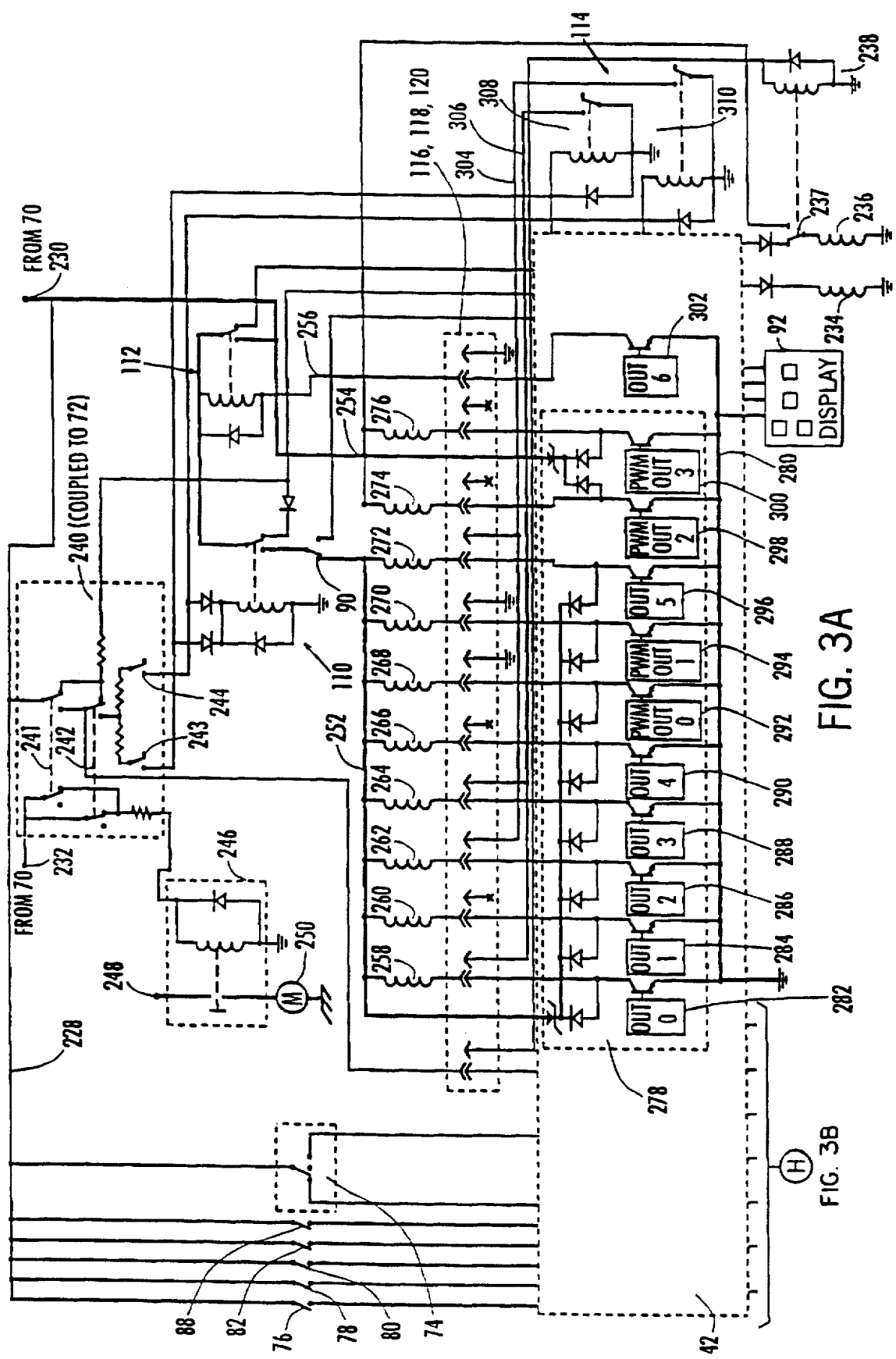
FIGS. 3A-B are a schematic diagram of a presently preferred embodiment of control circuitry for the control system of FIGS. 1A-B.
Figure 4:
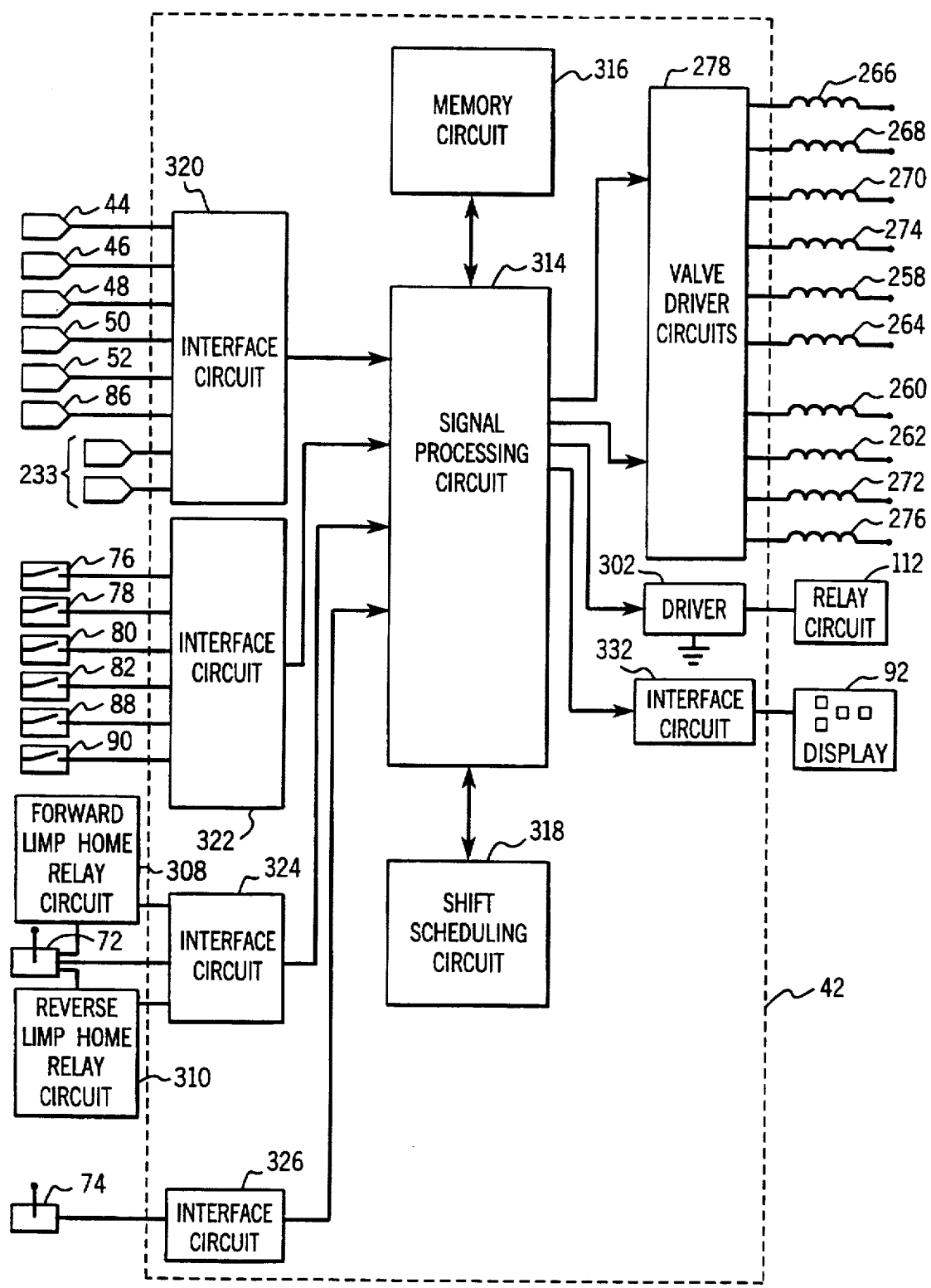
FIG. 4 is a block diagram illustrating certain functional circuitry included in the control system of FIGS. 1A-B.

In the presently preferred embodiment of control system 38, controller 42 includes a programmed digital microprocessor, memory circuitry and interface and signal conditioning circuitry for receiving input signals from the sensors and command devices discussed above and for applying control signals to directional control valving 126 coupled to transmission 14. FIGS. 3A–B illustrates the presently preferred arrangement and interconnection between the various components of control system 38, while FIG. 4 shows the flow of certain key signals in the system between functional circuitry included in controller 42. Turning first to FIGS. 3A–B, a voltage supply line 228 is indicated as coupled to a lead 230 from key switch 70. Lead 230 couples line 228 to a source of electrical power (i.e. the electrical system of vehicle 10), when key switch 70 is placed in a "run" position. Key switch 70 is also coupled to a second lead 232 which receives electrical power when key switch 70 is placed in a "start" position. As shown in FIGS. 3A–B, auto/manual switch 76, diagnostic switch 78, creeper switch 80, additional switches 82 and top-of-clutch switch 88 are coupled between power line 228 and controller 42. Thus, when each switch is closed, a corresponding power signal is applied to an input of controller 42. Bump lever 74 is similarly coupled between power line 228 and controller 42. Bump lever 74 is biased in a center or neutral position in which it applies no signal to controller 42, and is movable to increment and decrement positions in which corresponding increment and decrement signals are applied to controller 42. Also as illustrated in FIGS. 3A–B, sensors 44, 46, 48, 50 52 and 86 are coupled to inputs of controller 42, whereas display 92 is coupled to outputs of controller 42. Controller 42 may include other inputs for additional sensors, designated generally at 223 in FIGS. 3A–B, such as transmission oil temperature sensors, pressure sensors and the like.

It should be noted that, while the various sensors and command devices discussed above are shown and described as dedicated devices included in control system 38 and coupled directly to controller 42, where vehicle 10 includes similar or redundant devices as part of other on-board control systems, controller 42 may be coupled to a data bus or similar data sharing circuit and obtain signals for control of transmission 14 as required from the data bus. Similarly, signals generated by sensors and command devices included in control system 38 may be shared by other on-board control systems via a data bus.

As shown in FIGS. 3A–B, control system 38 includes a creeper solenoid coil 234 coupled to an output of controller 42 for shifting a hydraulic directional control valve in valving 126 for directing pressurized fluid to creeper clutch 136. In addition, a park solenoid coil 236 is coupled to an additional output of controller 42 through a park contact 237 opened and closed by a limp home park relay circuit 238. Park solenoid coil 236 may be energized by controller 42 or by operation of limp home park relay circuit 238 as described below.

An FNRP circuit 240 is electrically coupled to power supply line 228 and to lead 232, and mechanically coupled to FNRP lever 72. FNRP circuit 240 includes a park switch 241, a neutral switch 242, a forward switch 243 and a reverse switch 244. Park switch 241 receives power from supply line 228, as does neutral switch 242. Park switch 241 is closed by placing lever 72 in its "park" position. Park switch 241 and neutral switch 242 are, in turn, coupled to a starter relay circuit 246 and to neutral latch circuit 112 as shown in FIG. 3 for preventing vehicle 10 from starting in a condition in which vehicle 10 may inadvertently move due to gear engagement as described below. When FNRP lever 72 is moved into its "neutral" position, neutral switch 242 is closed, while forward and reverse switches 243 and 244 are open. When FNRP lever 72 is then moved to a "forward" or "reverse" position, neutral switch 242 is opened and the corresponding forward or reverse switch 243 or 244 closed.

Starter relay circuit 246 is coupled to a power source, such as to the vehicle electrical system, through a lead 248. Lead 248 delivers an energizing signal to the vehicle starter 250, but may do so only when relay circuit 246 closes a connection between lead 248 and starter 250. Relay circuit 246 is powered only when park switch 241 or neutral switch 242 is closed (i.e. when FNRP lever 72 is in its "park" or its "neutral" position). Thus, park switch 241, neutral switch 242 and starter relay circuit 246 interrupt power to starter 250 when FNRP lever 72 is its "forward" or "reverse" positions, thereby preventing starter 250 from being energized through normal means (i.e. by turning key switch 70 to its "start" position) unless transmission 14 is placed in a neutral or parked condition (i.e. disengaged).

Neutral latch circuit 112 and neutral relay circuit 110 are arranged to provide power to drive directional control valving 126 via power supply lines 252 and 254 as follows. Neutral latch circuit 112 includes a relay coil coupled to controller 42 through a ground connection 256. In normal operation, controller 42 grounds neutral latch circuit 112 to enable its energization. As discussed below, controller 42 may interrupt this ground connection to disable or unlatch circuit 112 when desired. In FIGS. 3A–B, neutral latch circuit 112 is illustrated in its unlatched or open position, wherein neutral latch circuit 112 permits no power to flow from supply line 228 to supply line 252. However, when FNRP lever 72 is placed in a neutral position, closing neutral switch 242, power is allowed to flow through neutral latch circuit 112 to ground through controller 42, thereby energizing the coil of neutral latch 112, closing the relay. Because power then flows to the relay coil from supply line 228, the relay remains latched. Neutral latch circuit 112 thus disables transmission 14 unless and until FNRP lever 72 is placed in a neutral position and key switch 70 is moved to its "run" position. Once these two criteria are satisfied, latch 112 remains energized until key switch 70 is moved out of its "run" position or until controller 42 interrupts ground connection 256.

Neutral relay circuit 110 is coupled between neutral latch circuit 112 and supply line 252. Neutral relay circuit 110 is enabled upon energization of neutral latch relay 112, and itself is energized when either forward switch 243 or reverse switch 244 is closed by moving FNRP lever 72 to its forward or reverse position. When either switch 243 or 244 is thus closed, the coil of relay circuit 110 is energized, drawing the relay closed and providing power to supply line 252. Subsequently, when FNRP lever 72 is moved to its neutral position, opening both forward and reverse switches 243 and 244, power is interrupted to neutral relay circuit 110, causing the relay to open and interrupting power to supply line 252. Neutral relay circuit thus disables transmission 14 by interrupting power to valving 126 when FNRP lever 72 is placed in a neutral position. It should be noted that bottom-of-clutch switch 90 also is located in series between neutral relay 110 and supply line 252. When an operator depresses clutch pedal 84 fully to a bottom-of-clutch position, switch 90 shifts from the closed position illustrated in FIGS. 3A–B to an open position, thereby interrupting power to supply line 252, placing transmission 14 in neutral and applying a bottom-of-clutch signal to controller 42.

As discussed above, each directional control valve included in valving 126 includes a solenoid coil that is energized to shift the corresponding valve, permitting pressurized fluid to flow to a clutch of transmission 14. The solenoid coils for valving 126 are illustrated schematically in FIG. 3. In the presently preferred embodiment, eight such solenoid coils, 258, 260, 262, 264, 266, 268, 270 and 272, are electrically coupled to supply line 252 for engaging clutches 154, 156, 202, 192, 194, master clutch 182, clutch 170 and reverse clutch 178, respectively. Two additional coils, 274 and 276 are coupled to supply line 254 for engaging clutches 172 and 174, respectively. Coils 258 through 276 are, in turn, coupled to solenoid driver circuits 278 in controller 42 which selectively couple the coils to a common ground line 280, thereby energizing the coil to shift an associated valve and engage a clutch. In the presently preferred embodiment, valve drivers 278 include on/off-type drivers 282, 284, 286, 288, 290 and 296, coupled to coils 258, 260, 262, 264, 266 and 272, respectively. Several pulse-width-modulated drivers 292, 294, 298 and 300, are provided for driving coils 268, 270, 274 and 276, respectively. It should be noted that in the present implementation of control system 38, only master clutch 182, engaged by coil 268 through pulse-width-modulated driver 294 is engaged and disengaged by modulation. Other pulse-width-modulated drivers 292, 298 and 300 either fully energize or fully de-energize their associated valve coils. However, the provision of these pulse-width-modulated drivers is preferred to permit future adaptation of controller 42 for additional clutch modulation tasks.

In addition to valve drivers 278, controller 42 includes an additional switching circuit 302 coupled to ground connection 256 from neutral latch circuit 112. Switching circuit 302 is electrically coupled to common ground line 280 and permits controller 42 to selectively unlatch neutral latch circuit 112, thereby interrupting power to supply lines 252 and 254, disabling valve coils 258 through 276 and placing transmission 14 in neutral. In normal operation, however, controller 42 maintains circuit 302 closed, thereby grounding connection 256.

It will be noted that valve coils 274 and 276 are coupled to power supply line 254, which receives electric power when key switch 70 is in a "run" position, energized even when vehicle 10 is in neutral or park. Thus, controller 42 may energize coils 274 and 276 to engage clutches 172 and 174 although the remainder of the valve solenoids are disabled. In the presently preferred embodiment, controller 42 engages clutches 172 and 174 when FNRP lever 72 is placed in its "neutral" or "park" position for more than 0.1 second, thereby locking intermediate transmission shaft 162 against rotation. Locking shaft 162 against rotation effectively defeats hydraulic drag within transmission 14 that might otherwise tend to transmit some torque through the transmission to one or more output shaft. The time delay in locking shaft 162 permits the vehicle operator to traverse the "neutral" and "park" positions quickly without engaging clutches 172 and 174. In addition, transmission 14 includes a locking pawl (not shown), spring biased into an engaged position wherein it blocks rotation of at least output shaft 58. During normal (i.e. non-parked) operation of transmission 14, the pawl is held in a non-engaged position by energizing park solenoid coil 236 via an appropriate control signal from controller 42. When FNRP lever 72 is placed in its "park" position, however, controller 42 de-energizes coil 236, thereby releasing the pawl and preventing rotation of the transmission output shaft.

As illustrated in FIGS. 3A–B, park switch 241, valve coils 258 through 276, and ground connection 256 are coupled to controller 42 through harness connectors 116 and 118. The connections illustrated in FIG. 3 represent those present when connectors 116 and 118 are mated, as for normal operation of transmission 14. Upon the occurrence of certain system failures, such as failure of controller 42, control system 38 may be placed in a "limp home" configuration by uncoupling connector 116 from connector 118 and mating connector 118 with limp home connector 120 in a manner generally known in the art. The circuit connections present in the limp home configuration of connectors 118 and 120 are those made by shifting the upper lines entering the box shown in broken lines in FIGS. 3A–B, to the right one step. Thus, coils 260, 266, 274 and 276 make no connection in the limp home configuration, while coils 262 and 272 are coupled to a first alternative grounding line 304 and coils 258 and 264 are coupled to a second alternative grounding line 306. It should also be noted that in the limp home configuration, valve coils 268 and 270 are coupled directly to ground, resulting in engagement of clutch 170 and master clutch 182. In addition, ground line 256 from neutral latch circuit 112 is grounded in the limp home configuration, while parking switch 241 is coupled directly to limp home park relay circuit 238.

Alternative grounding lines 304 and 306 are coupled to reverse and forward limp home relay circuits 310 and 308, respectively. Forward limp home relay circuit 308 is, in turn, directly coupled to forward switch 243, while reverse limp home relay circuit 310 is directly coupled to reverse switch 244. With connectors 118 and 120 thus mated in the limp home configuration described above, forward limp home relay circuit 308 is closed by moving FNRP lever 72 to its forward position, thereby closing forward switch 243. Similarly, reverse limp home relay circuit 310 is closed by moving FNRP lever 72 to its reverse position, thereby closing reverse switch 244. Energizing forward limp home relay circuit 308 grounds line 306, thereby energizing coils 266 and 258, engaging clutches 172 and 156, and placing transmission 14 in the 8th forward gear. Energizing reverse limp home relay circuit 310 grounds line 304, thereby energizing coils 262 and 272, and placing transmission 14 in the 1st reverse gear. This limited limp home operation of transmission 14 permits an operator to transport vehicle 10 in the event of a system failure, including failure of controller 42.

It should be noted that limp home park relay circuit 238 is energized when connectors 118 and 120 are mated in the limp home configuration and FNRP lever 72 is placed in positions other than its "park" position. When energized, relay circuit 238 shift contacts 237, electrically connecting park solenoid coil 236 between power line 254 and ground, energizing coil 236 and thereby withdrawing the parking pawl from its engaged position to permit vehicle 10 to move. When FNRP lever 72 is moved to its "park" position, power is interrupted to circuit 238, releasing contact 237 to return to the position shown in FIG. 3 and de-energizing coil 236 to release the pawl.

As illustrated in FIGS. 3A–B and 4, signals from sensors 44, 46, 48, 50, 52, 86 and 233, and from switches 76, 78, 80, 82, 88 and 90 are applied to controller 42 via their respective communication links. Similarly, the states of FNRP lever and bump lever 74 are communicated to controller 42. In the presently preferred embodiment, controller 42 is a microprocessor-based digital controller including a signal processing circuit 314, typically configured through appropriate coding of a microprocessor, such as an Intel 80C198 microcontroller. Controller 42 further includes appropriate memory circuitry 316, which preferably includes electronically erasable programmable read only memory (EEPROM) and random access and read only memory (RAM and ROM) for storing a preset, cyclic transmission control routine implemented by signal processing circuit 314, calibration values for the various clutches and other calibrated components of control system 38, as well as various temporarily stored values used by controller 42, such as command values, sensed values and the like. A shift scheduling circuit 318, illustrated in FIG. 4 as separate from signal processing circuit 314 and memory circuit 316, but typically configured via coding within the microprocessor, functions with signal processing circuit 314 to schedule shifts into and out of gear ratios based upon the control routine executed by signal processing circuit 314.

Signal processing circuit 314 preferably includes an on-board analog-to-digital converter (not represented in FIG. 4) for converting input parameter signals directly to digital signals for processing. However, controller 42 will typically include interface circuits 320, 322, 324 and 326 for converting and conditioning the sensed and command signals produced by the system sensors and command devices into filtered signals and for isolating signal processing circuit 314 from power surges and the like. Moreover, controller 42 includes valve driver circuits 278, discussed above for converting control signals output by signal processing circuit 314 into drive signals for energizing valve coils 266 through 276. Neutral latch circuit 112 is also coupled to signal processing circuit 314, which monitors the state of circuit 112 and controls grounding of circuit 112 via driver 302. Display 92 is coupled to signal processing circuit 314 through an interface circuit 332. The particular configuration of interface circuits 320, 322, 324, 326 and 332 will vary depending upon the particular sensors, command devices and signal processing circuitry employed in the system. The construction and operation of such interface circuitry is well known to those skilled in the art.

In operation, sensors 44 through 52, 86 and 233 continuously apply their sensed parameter signals to interface circuit 320, which filters and converts these signals to a range and form usable by signal processing circuit 314. Similarly, command devices 72 through 82, 88 and 90 apply signals to signal processing circuit 314 via their respective interface circuits 324 and 326, signal processing circuit 314 typically accessing the various command signals periodically as required by the transmission control routine stored in memory circuit 316. When automatic/manual switch 76 is placed in its "manual" position, transmission 14 may be shifted upon direct command from the vehicle operator by manipulation of clutch pedal 84 and levers 72 and 74. When automatic/manual switch 76 is placed in its "automatic" position, however, signal processing circuit 314 cycles through the transmission control routine as accessed from memory circuit 316 and, based upon the input and command signals applied by the sensors and command devices, determines when and how transmission 14 is to be shifted between the gear ratios described above, as well as when portions of control system 38 should be disabled, such as by interrupting the ground to neutral latch circuit 112. As will be appreciated by those skilled in the art, memory circuit 316 stores as part of the control routine, a table of gear ratios available through particular combinations of transmission clutches as described above. Shifts selected by signal processing circuit 314 are based upon these preset combinations. The overall transmission control routine may include various subroutines for controlling transmission operation in specific situations, such as for ground-speed-matching. Generally, however, the overall control routine permits modulated shifting, including modulated shuttle shifting, skip shifting and power shifting, all of which are techniques well known in the art.

Signal processing circuit 314 cooperates with shift scheduling circuit 318 to schedule the shifts (i.e. engagement and disengagement of combinations of clutches) identified by signal processing circuit 314. As mentioned above, in the presently preferred embodiment, signal processing circuit 314 and shift scheduling circuit 318 are configured in a programmed microprocessor, shift scheduling circuit 318 effectively being an aspect or subroutine of the overall control routine, adapted to schedule disengagement of "outgoing" clutches and engagement of "in-coming" clutches to obtain smooth transitions between gear ratios. Based upon this scheduling, signal processing circuit 314 generates appropriate control signals to energize and de-energize coils 266 through 276, and applies these control signals to the coils through driver circuits 278 to execute the selected shifts.

In normal operation, a vehicle operator typically configures control system 38 for automatic or manual operation by manipulating automatic/manual switch 76. The operator may then preselect forward and reverse commanded gear ratios, which are displayed on display 92. In the preferred embodiment, these gear ratios may be preselected by the vehicle operator. Controller 42 will then schedule shifts to obtain the commanded gear ratio upon FNRP lever 72 being moved to either its "forward" or "reverse" position. Such shifting will typically be accomplished through the use of skip shifting, shuttle shifting and power shifting techniques as discussed above. During steady state operation of vehicle 10 in either the forward or the reverse direction, the preselected gear ratios indicated on display 92 will generally be engaged as the commanded gear ratio, unless changed by the operator. The operator may then increment or decrement the commanded gear ratio by moving bump lever 74 to its "increment" or "decrement" position. Bump lever 74 may be held in either position to increment or decrement the commanded gear ratio through more than one ratio. Bump lever 74 is released once the desired commanded gear ratio is reached.

Figure 5:
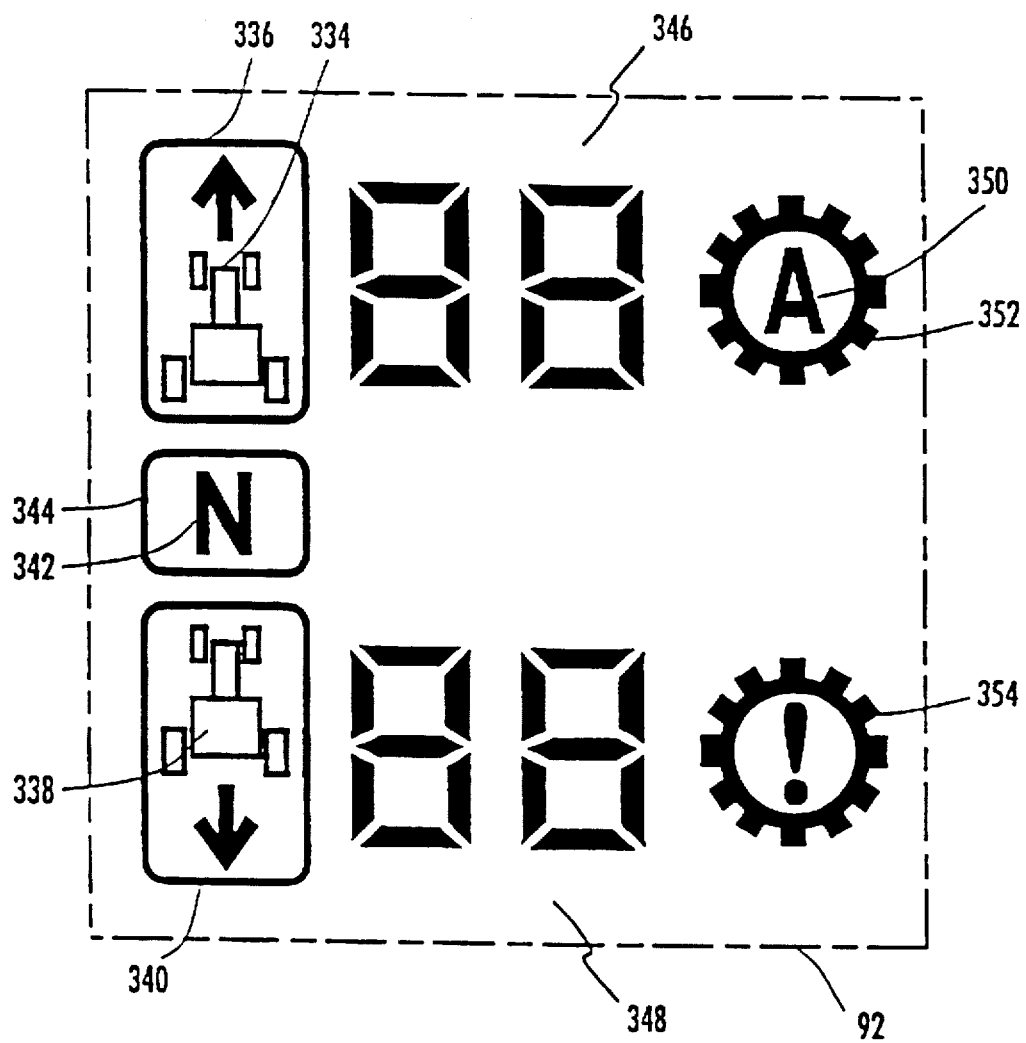
FIG. 5 illustrates a portion of a control panel display in accordance with the presently preferred embodiment, indicating information available to the vehicle operator during operation of the control system.

In addition to applying control signals to coils to engage and disengage transmission clutches, signal processing circuit outputs signals to display 92 to provide the vehicle operator with information on the operation of transmission 14 and controller 42. In the presently preferred embodiment, as illustrated in FIG. 5, display 92 includes a series of icons for conveying information to the vehicle operator. These icons include a forward icon 334, a forward box 336, a reverse icon 338 and reverse box 340, and a neutral icon 342 and neutral box 344. In addition, display 92 includes forward digits 346 and reverse digits 348, an automatic icon 350 surrounded by a transmission icon 352, and a diagnostics icon 354. In the preferred embodiment, the forward, reverse, neutral and transmission icons, 334, 338, 342 and 352, respectively, are continuously visible after vehicle 10 is powered up. When FNRP lever 72 is placed in its "forward," "reverse" or "neutral" position, thereby closing forward, reverse or neutral switches, 243, 244 or 242, respectively, the corresponding box icon 336, 338 or 344 is illuminated, indicating the then current state of transmission 14. As described above, control system 38 places transmission 14 in a neutral condition upon start up, resulting in illumination of neutral box 344 until forward or reverse gear engagement. When automatic/manual switch 76 is placed in its "automatic" position, permitting controller 42 to control engagement and disengagement of transmission 14 in accordance with the particular routine stored in memory circuit 316, automatic icon 350 is illuminated. In normal operation, forward and reverse digits 346 and 348 display commanded forward and reverse gear ratios into which transmission 14 will be shifted by controller 42 upon movement of FNRP lever 72 to its "forward" or "reverse" positions as described above. However, digit displays 346 and 348 preferably permit additional information to be conveyed to the operator. For example, when FNRP lever 72 is placed in its "park"

position, digit display 348 indicates the letter "P." In addition, digit displays 346 and 348 are preferably used to convey error messages for system diagnostics. When controller 42 determines that a default condition is present in system 38, diagnostic icon 354 becomes visible. Such fault conditions may include, by way of example, failure of a solenoid coil or valve driver, a difference between a detected clutch pressure and the state of a solenoid coil, open circuits and the like. Moreover, controller 42 preferably includes a diagnostics routine, of a type generally known in the art, that permits error codes indicative of such failures to be accessed from memory circuit 316. Such error codes may be conveniently displayed in two-digit code form on digit displays 346 and 348.

As discussed above, neutral relay circuit 110 and neutral latch circuit 112 prevent power from being transmitted to coils 258 through 276 during startup of vehicle 10 unless and until transmission 14 is placed in a neutral condition. Also as mentioned above, switching circuit 302 permits controller 42 to interrupt a current carrying path through ground connection 256 and ground line 280 during operation of transmission 14. Thus interrupting the ground connection of neutral latch circuit 112 de-energizes the coil of circuit 112, in turn causing the switch of circuit 112 to open. Opening the switch of circuit 112 has the effect of interrupting power to power line 252 feeding solenoid coils 258 through 272. In this manner, controller 42 can trigger switching circuit 302 to change states, resulting in interrupting the current carrying path through circuit 112 and thereby prevent energization of coils 258 through 272.

In should be noted that, while a separate neutral circuit may be provided between the vehicle power source and coils 258 through 272, in the presently preferred embodiment illustrated, the same neutral circuitry that provides the neutral start feature describes above also serves to place transmission 14 in a neutral condition under the command of controller 42 during operation of vehicle 10. Moreover, channeling ground connection 256 of neutral latch circuit 112 through switching circuit 302 conveniently permits the current carrying path to coils 258 through 272 to be selectively interrupted as part of a preset transmission control routine implemented by controller 42.

In the presently preferred embodiment, controller 42 causes interruption of current carrying paths to coils 258 through 272 by removing the ground connection to neutral latch circuit 112 upon detection of certain fault conditions of vehicle 10 or control system 38. In particular, controller 42 receives input signals from sensors 44, 46, 48, 50, 52, 86 and additional sensors 233, from switches 76 through 90, and from switches 241, 242, 243 and 244, and compares these signals to detect certain system failures or inconsistencies. Controller 42 may also receive additional input signals from other systems on vehicle 10, such as valve coil diagnostics circuits of a type generally known in the art for detecting open or short circuits indicating failure of one of coils 258 through 276. While certain types of failure may cause controller 42 to take remedial actions, such as avoiding particular gear ratios requiring energization of a failed valve coil, controller 42 may treat other types of failure as requiring transmission 14 to be placed in a neutral condition. This neutral condition is attained by removing the ground connection to neutral latch circuit 112 as described above. In the preferred embodiment, failures resulting in such unlatching of circuit 112 include: disagreements or inconsistencies between outputs of top-of-clutch switch 88, bottom-of-clutch switch 90 and clutch position sensor 86; hydraulic system pressure out of a preset range (i.e. too high or low); battery voltage below a preset minimum or below operational limits of valve coils or controller 42; engine speed out of range (i.e. too high or low); clutch pedal position out of range; disagreement or inconsistencies between outputs of neutral, forward and reverse switches 242, 243, 244; logic supply voltage out of range; increment and decrement output signals both received from bump lever 74; and neutral latch circuit 112 open or shorted.

The types of failures resulting in unlatching neutral latch circuit 112 are termed "fault forced neutral" failures. In the presently preferred embodiment, when such failures occur power is also removed from coils 274 and 276. Because unlatching circuit 112 completely disables transmission 14 until vehicle 10 is restarted in a neutral condition, following fault forced neutral interruption of the ground connection to circuit 112, the vehicle operator must cycle key switch 70 and restart the vehicle in neutral to relatch the circuit.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims. For example, while in the preferred embodiment described above removal of the ground connection to circuit 112 results in interrupting a current carrying path between a source of electrical power and coils 258 through 272, a similar disabling function may be accomplished by interrupting a current carrying path between the coils and ground. Moreover, switching circuit 302 preferably interrupts a current carrying path between circuit 112 and ground, a similar circuit, under the control of controller 42, could instead interrupt a current carrying path between circuit 112 and a source of electrical power.

I claim:

1. A control system for a vehicle transmission of the type including a plurality of intermeshing gears and a plurality of clutches associated with the gears, the gears being coupled through an input shaft to a vehicle engine and through an output shaft to a driven axle, the clutches being engageable and disengageable in predetermined combinations to provide various drive gear ratios between the input shaft and the output shaft in response to control signals, the control system comprising:

a plurality of actuator coils actuatable to selectively engage and disengage the clutches;

a coil enabling circuit including a switch for completing a current carrying path through the actuator coils and a relay coil for maintaining the switch in an actuator coil enabled position; and a control circuit coupled to the coil enabling circuit, the control circuit selectively completing and interrupting a current path through the relay coil to control the position of the switch and thereby enable and disable the actuator coils.

2. The control system of claim 1, wherein the control circuit includes a switching device coupled to a ground side of the relay coil, and interrupts the current path through the relay coil by interrupting a path to ground.

3. The control system of claim 2, wherein the control circuit includes a sensor for detecting an operating condition of the vehicle, and the control circuit interrupts the current path through the relay coil upon detection of a fault condition in the sensor.

4. The control system of claim 1, wherein the actuator coils are solenoid coils associated with valving, and the clutches are hydraulically engaged clutches.

5. The control system of claim 1, wherein the coil enabling circuit is a neutral latching relay circuit that enables the solenoid coils after startup of the vehicle engine when a neutral command signal is received from an operator-movable command device.

6. The control system of claim 1, wherein the control circuit includes a sensor for detecting an operating condition of the vehicle, and the control circuit interrupts the current path through the relay coil upon detection of a fault condition by the sensor.

7. The control system of claim 1, wherein the control circuit includes a programmed microprocessor and a solid state switching device coupled to the relay coil, the microprocessor controlling a conductive state of the switching device to selectively complete and interrupt the current path through the relay coil.

8. In a work vehicle, such as an agricultural tractor, a control system for selectively placing a transmission in a neutral state, the transmission being of the type including a plurality of intermeshing gears associated with a plurality of clutches, the clutches being engageable and disengageable in predetermined combinations by electrical energization and de-energization of actuator coils to establish predetermined forward and reverse gear ratios between a vehicle engine and a driven axle through the transmission, the control system comprising:

a coil enabling circuit including a switch having at least two conductive states for selectively completing and interrupting a common electrical current carrying path to the actuator coils; and a control circuit coupled to the coil enabling circuit, the control circuit controlling the conductive state of the switch to disable the actuator coils without operator intervention during operation of the vehicle.

9. The control system of claim 8, wherein the clutches are fluid controlled clutches and the actuator coils control the flow of pressurized fluid to the clutches.

10. The control system of claim 8, wherein completing the common current carrying path couples the actuator coils to a source of electrical power.

11. The control system of claim 8, wherein the coil enabling circuit is a relay circuit including a relay coil, and the control circuit controls the conductive state of the switch by selectively completing and interrupting a current carrying path through the relay coil.

12. The control system of claim 11, wherein the relay circuit is configured to latch the switch in a coil enabled conductive state after startup of the vehicle engine with the transmission in a neutral state.

13. The control system of claim 11, wherein the control circuit includes a sensor for detecting an operating condition of the vehicle, and the control circuit interrupts the current path to the actuator coils upon detection of a fault condition by the sensor.

14. The control system of claim 8, wherein the control circuit includes a sensor for detecting an operating condition of the vehicle, and the control circuit interrupts the current path to the actuator coils upon detection of a fault condition in the sensor.

15. The control system of claim 8, wherein the control circuit includes a programmed microprocessor and a solid state switching device coupled to the coil enabling circuit, the microprocessor controlling a conductive state of the switching device to selectively enable and disable the actuator coils.

16. A control system for a vehicle transmission of the type including an input shaft, an output shaft, a plurality of intermeshing gears, a plurality of clutches associated with the gears and a plurality of electrical coils energizable to selectively engage and disengage the clutches in predetermined combinations to establish gear ratios between the input shaft and the output shaft, the control system comprising:

a neutral circuit coupled to the coils, the neutral circuit preventing energization of the coils to place the transmission in a neutral condition upon startup of the vehicle; and a control circuit coupled to the neutral circuit, the control circuit cooperating with the neutral circuit to selectively prevent energization of the coils after startup of the vehicle.

17. The control system of claim 16, wherein the neutral circuit includes a relay circuit that completes a current carrying path to the coils when an operator-movable command device is placed in a neutral position upon startup of the vehicle.

18. The control system of claim 17, wherein the relay circuit includes a relay coil configured to latch in an energized state after startup of the vehicle in a neutral condition to maintain the current carrying path complete.

19. The control system of claim 18, wherein the control circuit is coupled to the relay coil and prevents energization of the coils by interrupting a current carrying path through the relay coil.

20. The control system of claim 16, wherein the neutral circuit is a relay circuit configured to latch upon startup of the vehicle in a neutral condition and the control circuit includes a microprocessor configured to unlatch the relay circuit.

21. The control system of claim 20, wherein the neutral circuit couples the coils to a source of electrical power after startup.

22. The control system of claim 20, wherein the control circuit unlatches the relay circuit by interrupting a current carrying path between the relay circuit and ground.

23. The control system of claim 16, wherein the control circuit prevents energization of the coils upon detection of a fault condition in the control system.

* * * * *